United States Patent Office 3,131,199
Patented Apr. 28, 1964

3,131,199
2,3-DIHYDRO-2-BENZOFURANAMINES
Anthony Maitland Roe, Welwyn Garden City, and George Lawrence Willey, Harpenden, England, assignors to Smith Kline & French Laboratories, Philadelphia, Pa., a corporation of Pennsylvania
No Drawing. Filed Aug. 10, 1962, Ser. No. 216,052
Claims priority, application Great Britain Oct. 18, 1961
6 Claims. (Cl. 260—346.2)

This invention relates to new compounds having pharmacodynamic activity. More precisely this invention relates to novel quaternary derivatives of aminocoumarans having antihypertensive activity due to their specific adrenergic nerve blocking activity.

The compounds of this invention are exemplified by the following structural formula:

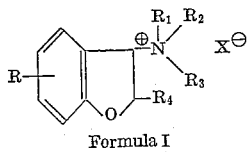

Formula I in which:

$R_1$, $R_2$ and $R_3$ are lower alkyl;
$R_4$ is hydrogen or lower alkyl of 1 to 2 carbon atoms;
R is one or more substituents on the aromatic ring such as hydrogen, halogen such as fluoro, chloro or bromo, trifluoromethyl, lower alkyl or lower alkoxy; and
$X^\ominus$ is a pharmacologically inert and acceptable anion which forms a stable salt.

The anion $X^\ominus$ is not a critical part of this invention but may be varied widely as known to the art such as the exemplary inorganic anions, the chloride, bromide, sulfate, phosphate, sulfonate or iodide anions or the organic anions such as the benzene sulfonate or toluene sulfonate anions.

Particularly active adrenergic nerve blocking compounds are those of the following formula:

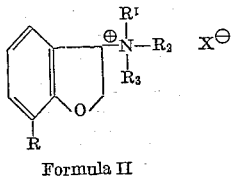

Formula II in which:

R is methyl, ethyl, methoxy, ethoxy or halogen;
$R_1$, $R_2$ and $R_3$ are methyl or ethyl and
$X^\ominus$ is as defined above.

The most advantageous compounds of this invention are those represented by Formula II in which R is methyl.

The coumaran compounds of this invention are prepared by reacting the corresponding tertiary amines with a reactive lower alkyl halide or benzene sulfonate usually in excess in an organic solvent in which the reactants are substantially soluble at room temperature or up to the boiling point of the solvent. The desired reaction product either crystallizes or is obtained by evaporation. Other anions as stated above can be exchanged with the halo or sulfonate ion by methods known to the art if desired.

The tertiary amine congeners of the compounds of Formulas I and II are also objects of this invention having obvious utility as well as some pharmacodynamic activity in their own right but not as pronounced as the quaternary salts. No coumaran tertiary amines are to our knowledge known to the art. These compounds are however easily prepared from the primary amines by standard reductive alkylation or halide alkylation procedures. The primary amines are prepared by reduction of the coumarin-3-oximes which are known or are in turn prepared by reacting the known coumaran-3-ones with hydroxylamine.

The various coumaran-3-ones are either known to the art or are prepared by methods disclosed in Elderfield's "Heterocyclic Compounds," volume 2, pp. 1–67 (1951).

The amines are alternatively prepared by reducing known 3-nitrobenzofurans with a metal hydride reducing agent such as lithium aluminum hydride or by reductive amination of the coumaran-3-one using ammonia or an alkylamine in the presence of a reducing agent.

As noted above, the compounds of this invention are potent adrenergic nerve blocking agents when administered to the animal organism. The compounds are formulated into solid or liquid dosage units and administered to the subject either orally or parenterally as desired in an amount sufficient to induce the proper antihypertensive effects.

More specifically the dosage unit of the pharmaceutical composition may be in liquid or solid form, for example, in the form of a solution, suspension, emulsion, packaged powder, encapsulated powder, tablet or lozenge. The composition will normally be administered orally so that the preferred compositions will be in a dosage unit form suitable for oral administration. However, the composition may be in a form suitable for parenteral administration, such as for example a sterile solution or suspension in water or other suitable liquid.

Examples of solid diluents which may be employed in the pharmaceutical compositions of the invention are lactose, sucrose, terra alba and starch. Examples of suitable liquid diluents are mineral or vegetable oils such as peanut oil, olive oil and sesame oil, alcohols, glycerol or other glycols, and water.

Examples of excipients which may be employed in the solid dosage unit forms of the compositions of the invention are adhesives such as acacia, gelatin, starch and polyvinylpyrrolidine, disintegrants such as α-cellulose and magnesium aluminium silicate, and lubricants such as magnesium stearate, stearic acid and talcum.

Examples of excipients which may be employed in the liquid dosage unit forms for oral administration are sweeteners such as glucose, sorbitol and saccharin, buffering agents such as citric acid, tartaric acid, phosphoric acid and the sodium or potassium salts of said acids, thickeners or emulsifying agents such as acacia, tragacanth, pectin and cellulose derivatives, and preservatives such as benzoic acid and parahydroxybenzoic acid.

Examples of excipients which may be employed in the liquid dosage unit forms for parenteral administration are buffering agents such as those previously mentioned, bactericides or bacteriostatics such as phenol, cresol, chlorbutol, chlorocresol and benzyl alcohol, and antioxidants such as sodium sulphite, sodium metabisulphite and ascorbic acid.

The terms lower alkyl and lower alkoxy where used herein denote groups having from 1 to 8 carbon atoms, preferably 1 to 2 carbons. It will be apparent to one skilled in the art that other moieties can be substituted for the $R_1$ arising from the active halide during quaternarization such as benzyl, hydroxyethyl, phenethyl, etc. Such moieties are included in this invention.

It will be apparent to one skilled in the art that the compounds described herein can exist in optically isomeric forms—note the 3 carbon atoms. The various isomers of these compounds are also included in this invention.

The following examples illustrate but are not designed to limit this invention.

*Example 1*

7-methylcoumaran-3-one oxime (84 g.) is dissolved in a mixture of absolute ethanol (1000 ml.) and glacial acetic acid (200 ml.) at about 65° C. Sodium amalgam (5%; 1600 g.) is added in portions during four hours, while the mixture is maintained at about 65° C. with efficient stirring. The mixture is kept under these conditions for a further six hours, then diluted with water (2700 ml.) and made acid to Congo red with diluted hydrochloric acid. Extraction with ether to remove acidic material is followed by basification and extraction of the resulting desired amine into ether. The desired amine (35 g.) is then distilled at 134° C./20 mm., 3-amino-7-methylcoumaran.

3-amino-7-methylcoumaran (16.2 g.), aqueous formaldehyde (37%; 19.5 ml.) and formic acid (98%; 23 ml.) are heated together on a steam bath for 12 hours. After cooling, diluting with water and basifying with dilute sodium hydroxide, the resulting desired dimethylamine is collected in ether, dried over sodium sulfate, and distilled at 127–128° C./21 mm.

3-dimethylamino-7-methylcoumaran is allowed to stand in the dark in a mixture of methyl iodide and methanol (1:1) for two days. Addition of ether gives a quantitative yield of the desired quaternary salt, which crystallizes from a mixture of methanol and ether (1:2) as colorless glistening needles, M.P. 255–258° C. (decomp.), 3-trimethylammonium-7-methylcoumaran iodide.

*Example 2*

3-amino-7-methylcoumaran (7.6 g.) is slowly added to acetic anhydride (52 ml.) with stirring and cooling. After 10 minutes the resulting mixture is poured into water and ice (300 g.). The solid which separates is collected and crystallized from 50% aqueous alcohol to give the desired amide. A second crystallization gives colorless needles, M.P. 154.5° C., 3-acetamido-7-methylcoumaran.

3-acetamido-7-methylcoumaran (11.7 g.) in tetrahydrofuran (240 ml.) is slowly added to a boiling stirred suspension of lithium aluminum hydride (3.5 g.) in tetrahydrofuran (50 ml.). The reaction mixture is heated under reflux for nine hours after addition of the amide. The excess of lithium aluminum hydride is destroyed by the addition of ethyl acetate, and the mixture is then added to 40% aqueous sodium hydroxide (500 ml.). The resulting desired amine is taken into ether and then into dilute hydrochloric acid from which it is liberated by basifying with sodium hydroxide, taken into ether again, dried over sodium sulfate, and distilled as a colorless oil B.P. 145–146° C./22 mm., 3-ethylamino-7-methylcoumaran.

3-ethylamino-7-methylcoumaran (10.8 g.) is slowly added to acetic anhydride (65 ml.) with cooling. The resulting mixture is then heated on a steam bath for 1 hour, cooled and poured into ice and water. The mixture is extracted with ether, the ether is washed until neutral with sodium hydroxide, dried over sodium sulfate and distilled to yield the desired amide, B.P. 123–126° C./0.7 mm.

This N-acetyl-3-ethylamino-7-methylcoumaran is reduced with lithium aluminum hydride as above to give 3-diethylamino-7-methylcoumaran, B.P. 142° C./18 mm.

3-diethylmethylammonium-7-methylcoumaran iodide is prepared from 3-diethylamino-7-methylcoumaran by treating with excess methyl iodide in methanol at room temperature. The resulting compound crystallizes in plates and rhombs from methanol-ether (1:2), M.P. 136° C.

*Example 3*

3-dimethylethylammonium-7-methylcoumaran iodide is obtained from 3-diethylamino-7-methylcoumaran by treatment with ethyl iodide in ethanol at room temperature. Crystallization from ethanol gives a colorless solid, M.P. 142–143° C.

*Example 4*

3-triethylammonium-7-methylcoumaran iodide is prepared from 3-diethylamino-7-methylcoumaran by treatment with ethyl iodide in ethanol. Careful crystallization from absolute alcohol-dry ether, followed by absolute ethanol, gives the desired quaternary salt as a colorless solid, M.P. 121–122° C.

*Example 5*

3-trimethylammoniumcoumaran iodide is prepared in a manner similar to that described in Example 1 for its 7-methyl-homologue. Crystallization from methanol-ether (1:3) gives colorless crystals, M.P. 173–174° C.; re-solidifying to decompose at 260–263° C.

*Example 6*

5-chlorocoumaran-3-one oxime is prepared from the known 5-chlorocoumaran-3-one [Schroeder et al., J. Org. Chem. 27, 586 (1962)] by reaction with hydroxylamine hydrochloride and sodium acetate. It crystallizes from ethanol in colorless needles, M.P. 189–191.5° C. (decomp.).

5-chlorocoumaran-3-one-oxime (173 g.) dissolved in alcohol (2000 ml.) is stirred at 60–65° C. Sodium amalgam (10%: 1700 g.) and glacal acetic acid (600 ml.) in ethyl alcohol (600 ml.) are added during three hours, the temperature remaining at 60–65° C. The thick suspension is stirred for two hours more. Ice and hydrochloric acid (6 N; 1400 ml.) are added to the cooled mixture, the mercury is separated and the acidic aqueous layer evaporated at reduced pressure (<30° C.) to about 3 liters. The concentrated solution is extracted with ether, some amine hydrochloride being precipitated, and then strongly basified with 50% aqueous sodium hydroxide. The 3-amino-5-chlorocoumaran is isolated by ether extraction and distillation at 98–101° C./0.4 mm.

3-amino-5-chlorocoumarin (30.0 g.) is added with cooling to formic acid (98%; 48 ml.) followed by aqueous formaldehyde (37%; 36 ml.). The mixture is heated on a steam bath for 24 hours, cooled, and basified with dilute sodium hydroxide. The desired tertiary amine is collected in ether, dried over sodium sulfate and distilled to give a colorless oil, B.P. 84° C./0.4 mm.

5-chloro-3-trimethylammoniumcoumaran iodide is prepared from 5-chloro - 3 - dimethylaminocoumaran and methyl iodide in methanol and is crystallized from ethanol as colorless cubes, M.P. 183.5–185° C. (decomp.).

*Example 7*

5-chloro - 3 - dimethylethylammoniumcoumaran iodide is prepared from 5-chloro - 3 - dimethylaminocoumaran and ethyl iodide in ethanol. It is crystallized from ethanol/ether, M.P. 79–81° C.

*Example 8* m-Tolyloxyacetyl chloride (498 g.) in dry dichloromethane (260 ml.) is added during one hour to a stirred suspension of powdered aluminum chloride (400 g.) in dichloromethane (1000 ml.) maintained at about −15° C. (internal temperature) by an external cooling bath. The mixture is stirred at −10° C. to −15° C. for 1½ hours more and then added to concentrated hydrochloric acid (700 ml.) and ice. The aqueous phase is separated and washed with dichloromethane. The combined organic solutions are washed with dilute sodium bicarbonate and evaporated to a small volume of residue which is exhaustively steam distilled. Sodium chloride (2000 g.) is added to the distillate (20 l.) which is allowed to stand in the cold.

The solid mixture of 4-methyl- and 6-methylcoumaran-3-ones is collected and dried.

The foregoing coumaranones in alcohol (900 ml.) are treated with hydroxylamine hydrochloride (155 g.), sodium actate (362 g.) and water (900 ml.) and slowly heated to boiling under reflux for 3 hours. The cooled solution is filtered, the solid washed with 50% aqueous alcohol and dried (230 g.). Crystallization from ethylacetate gives a mixture of colorless needles and pale yellow clusters, M.P. 144–146° C. A combination of mechanical separation and crystallizations from ether and ethyl acetate furnishes pure 4-methylcoumaranone oxime, M.P. 189–190° C. as the minor component, and pure 6-methyl-coumaranone-oxime, M.P. 169–170° C., as the major component.

3-amino - 6 - methylcoumaran, M.P. 41–43° C., B.P. 90–95° C./2 mm., is prepared in 67% yield in the same way as the 5-chloro-analogue (Example 6). The hydrochloride crystallized from ethanol decomposes >300° C.

The amine (10 g.) is alkylated in a solution of formaldehyde/formic acid to give the tertiary amine which (4 g.) is reacted with methyl iodide as described to give 6-methyl - 3 - trimethylammoniumcoumaran iodide.

*Example 9*

4-methylcoumaranone oxime (Example 8) is reduced, alkylated and reacted with ethyl chloride to give 4-methyl-3-dimethylethylcoumaran chloride.

Using synthetic methods as described in detail above; 5,7-dibromocoumaran - 3 - one [Fries et al., Ann., 372, 187 (1910)] is converted to 5,7-dibromo-3-dimethylbutylammoniumcoumaran iodide.

2,5-dimethylcoumaran - 3 - one [v. Auwers, Ber., 47, 3292 (1914)] is converted into 2,5-dimethyl - 3 - trimethylammoniumcoumaran bromide.

6-methoxycoumaran - 3 - one [Shriner et al., J. Am. Chem. Soc., 63, 1108 (1941)] is converted into 6-methoxy - 3 - triethylammoniumcoumaran iodide.

2-isopropyl - 6 - methoxycoumaran - 3 - one [prepared from the 3-hydroxy congener of Kamthony et al., J. Chem. Soc., 925 (1939)] is converted to 2-isopropyl-6-methoxy-3-tributylammoniumcoumaran sulfate.

m-α,α,α-Trifluorotolyloxyacetyl chloride (prepared from m-bromo-α,α,α-trifluorotoluene) substituted in Example 8 gives 6-trifluoromethyl - 3 - trimethylammoniumcoumaran iodide.

What is claimed is:
1. A chemical compound of the formula:

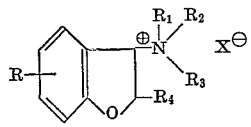

in which:
R is a member selected from the group consisting of lower alkyl, lower alkoxy, halogen, trifluoromethyl and hydrogen;
$R_1$, $R_2$ and $R_3$ are lower alkyl;
$R_4$ is a member selected from the group consisting of lower alkyl and hydrogen; and
X is a stable, pharmaceutically acceptable anion.

2. A compound of the formula:

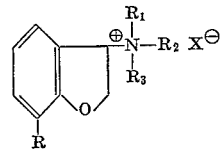

in which:
R, $R_1$, $R_2$ and $R_3$ are lower alkyl having 1 to 2 carbon atoms and
X is a stable, pharmaceutically acceptable anion.

3. 7-methyl - 3-tri - lower alkyl-ammoniumcoumaran iodide.

4. 7-methyl - 3 - dimethylethylammoniumcoumaran iodide.

5. A chemical compound selected from the group consisting of a base and its acid addition salts, said base being of the formula:

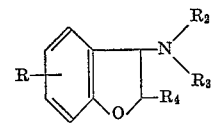

in which:
R is a member selected from the group consisting of lower alkyl, lower alkoxy, halogen, trifluoromethyl and hydrogen;
$R_2$ and $R_3$ are lower alkyl and
$R_4$ is a member selected from the group consisting of hydrogen and lower alkyl.

6. 7-methyl-3-dimethylaminocoumaran.

No references cited.